United States Patent
Dickinson et al.

(10) Patent No.: US 6,955,255 B2
(45) Date of Patent: Oct. 18, 2005

(54) ROTARY POWERED SNACK PIECE TURNOVER

(75) Inventors: Edward L. Dickinson, Littleton, MA (US); Kathryn Melissa Dove, Marshall, MI (US); Joseph H. Gold, Dallas, TX (US); Ponnattu Kurian Joseph, Irving, TX (US); Bruce LeDoyt, Newton, MA (US)

(73) Assignee: Frito-Lay North America, Inc., Plano, TX (US)

( * ) Notice: Subject to any disclaimer, the term of this patent is extended or adjusted under 35 U.S.C. 154(b) by 52 days.

(21) Appl. No.: 10/684,937

(22) Filed: Oct. 14, 2003

(65) Prior Publication Data

US 2005/0077150 A1 Apr. 14, 2005

(51) Int. Cl.[7] .............................................. B65G 15/14
(52) U.S. Cl. ...................................................... 198/603
(58) Field of Search ................................. 198/603, 604

(56) References Cited

U.S. PATENT DOCUMENTS

| | | | |
|---|---|---|---|
| 2,141,578 A | * | 12/1938 | Wellmar ...................... 34/640 |
| 2,144,720 A | | 1/1939 | Gibson |
| 2,152,939 A | * | 4/1939 | Wentworth .................. 198/603 |
| 3,872,752 A | | 3/1975 | Remde et al. |
| 3,883,283 A | * | 5/1975 | Herrera ....................... 425/337 |
| 3,911,805 A | | 10/1975 | Baird |
| 4,078,648 A | * | 3/1978 | Hinchcliffe et al. ....... 198/347.3 |
| 4,309,938 A | * | 1/1982 | Harmon ....................... 99/477 |
| 4,715,272 A | * | 12/1987 | Mendoza ..................... 99/339 |
| 5,392,696 A | * | 2/1995 | Navarro et al. ............... 99/339 |
| 5,423,414 A | * | 6/1995 | Vaughn et al. .............. 198/603 |
| 6,338,606 B1 | | 1/2002 | Bierschenk et al. |
| 6,412,397 B1 | | 7/2002 | McNeel et al. |
| 6,412,399 B1 | | 7/2002 | Graham et al. |
| 6,510,937 B1 | | 1/2003 | Braithwaite |

* cited by examiner

*Primary Examiner*—Richard Ridley
(74) *Attorney, Agent, or Firm*—Colin P. Cahoon; William S. Wang; Carstens & Cahoon LLP

(57) ABSTRACT

A flipping apparatus for turning over product pieces such as potato crisps having a first conveyor and a second conveyor. A terminal portion of the first conveyor is nested within a concavity defined by an upturned and curved portion of the second conveyor. A channel is provided between the first conveyor and the curved portion of the second conveyor through which the product pieces can pass. Centrifugal force along the curved portion promotes a gentle and effective transfer of the product pieces from the first conveyor to the second conveyor. Thereby, the product pieces are turned over.

6 Claims, 4 Drawing Sheets

ROTARY POWERED SNACK PIECE TURNOVER

BACKGROUND OF THE INVENTION

1. Technical Field

The present invention relates to a snack piece turnover device and method of using the same. More particularly, the invention relates to a snack piece turnover device employing a curved conveyor, which uses centrifugal force to turn snack pieces over, and the method of using the same.

2. Description of Related Art

Snack pieces are known to be prepared with the use of flyers. Generally, snack pieces such as potato and corn crisps are formed from dough and are sheeted and cut into discrete pieces (preforms) for treatment. Treatment involves cooking the preforms in a fryer to produce cooked snack pieces. Particularly with potato and corn crisps, a form fryer is beneficial because performs, which are sheeted and cut pieces of uncooked dough, can be molded and cooked into a desired product shape.

The dough comprises a substantially dry mixture of potato flakes and sugar. Other substances that may be utilized include starches for their ability to improve the texture, consistency, and durability of food products and to improve the processing of dough into food products. One or more emulsifiers may also be used for their ability to improve the processing of dough. After forming uncooked snack pieces, they can be processed into finished molded snack pieces.

A desirable feature of molded snack pieces is that they can be made uniform in size and shape. With uniformity, the snack pieces can be packaged in a seated alignment. This allows snack product to be packed in a canister rather than in a loose bag. Canister packaging provides a degree of protection against breakage of the snack pieces while providing improved transportability of the snack pieces both in bulk and in individual canisters. Also, canisters can be sealed with a lid after opening to deter product degradation.

For packaging of uniformly shaped product such as curved ellipses, (for example, an ellipse having its longer sides curved upward in the same direction) snack pieces are stacked first before filling in a canister. Snack pieces can be stacked one directly over another, or they can be partially overlapped in a similar manner as rooftop shingles are overlapped. After such overlapping, the product pieces are then pushed together so that each piece is directly over the other. While it is possible to stack curved product pieces either with concave sides up or concave sides down, the product pieces may be more amenable to stacking in one particular orientation, depending on the product shape.

For example, thin, elliptical product pieces having upwardly-curved sides are more easily stacked with their concave sides down rather than up. In the event that two adjacent product pieces fail to overlap, those pieces can only be forced to stack one over the other if their adjacent edges are at different heights. With their concave sides up, two adjacent elliptical product pieces cannot be stacked because their adjacent product edges would lie flat against the conveyor, and those edges would confront each other upon pushing the pieces together. With their concave sides down, however, the product pieces are able to rock back and forth on their downwardly curving edges in the direction of travel. This ability to rock makes it highly unlikely that the adjacent edges of two pieces would confront each other at the same vertical level. One product piece will thus be able to overlap and eventually stack over the other.

Because many form fryers produce concave-side-up snack pieces, such concave-side-up pieces must be flipped prior to packaging. FIG. 1 shows an example of a prior art snack piece-flipping device. The prior art flipping system 10 flips curved, elliptical snack pieces 12 from concave-side up to concave-side down using a vacuum suction roller 22. As shown, the snack pieces 12 have their longitudinal sides bent in the same direction, approximating a U-shape. The concave-side-up snack pieces 12 are conveyed on a wire-mesh type or other gas-permeable type of upper belt 20 towards the packaging stages. As the snack pieces 12 reach a vacuum suction roller 22 at the end of the upper belt 20, the snack pieces 12 are retained by vacuum to the surface of the upper belt 20 and moved around the end roller 22 until each snack piece 12 is inverted and above a lower belt 30, either right above or slightly downstream from the first roller 32 of the lower belt 30. Once inverted, the concave-side-down snack pieces 12 are released from the upper belt 20 and dropped onto the lower belt 30. The snack pieces 12 can then be stacked for packaging.

As is apparent, snack piece flipping technology allows snack pieces to be reoriented into positions more suitable for stacking. However, with prior art devices such as the vacuum roller 22 shown in FIG. 1, snack piece retention to the roller is critical to the flipping process. Vacuum rolls are problematic as snack piece retention is not particularly consistent or reliable. For instance, the vacuum roller 22 and the upper belt 20 shown in FIG. 1 are prone to clogging from debris. Clogging prevents the vacuum roller 22 from properly retaining control over the snack pieces 12, which may then drop prematurely from the vacuum roller 22. Another problem is that the snack pieces 12 can stick to the upper belt 20 for too long or too short a period of time. If the snack pieces are not released precisely at the same point over the lower belt 30, misalignment and/or breakage of snack pieces can occur. Furthermore, vacuum rolls require a significant amount of energy to create the necessary suction force. Therefore an improved, more efficient and reliable flipping device and method are desired to avoid these problems.

SUMMARY OF THE INVENTION

A product-flipping device in accordance with the invention flips products such as snack pieces. Snack pieces such as potato crisps or other farinaceous-based snack products are often prepared in form fryers producing molded snack pieces. These snack pieces have shapes with at least two sides. Depending on the particular shape of the snack pieces, it is often desirable to turn the snack pieces over and into an orientation more amenable to packaging and/or seasoning.

When using a form fryer to cook food products, a conveyor moves product from the fryer exit on towards packaging and/or seasoning. In one embodiment of the invention, the conveyor feeds the cooked product towards a flipping apparatus whereby the product pieces will be turned over. The flipping apparatus comprises a terminal portion of a first conveyor that is nested within an upturned and curved portion of a second conveyor. The upturned portion of the second conveyor follows a curved path that defines a concavity in which the product pieces are flipped as they are transferred from one conveyor to the other. A channel is provided between the terminal portion of the first conveyor and the upturned terminal portion of the second conveyor for allowing passage therethrough of the product pieces being flipped. Centrifugal force enables the product pieces to gently transfer from one conveyor to the other and to be gently flipped as they pass through the channel.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

Figure 2:
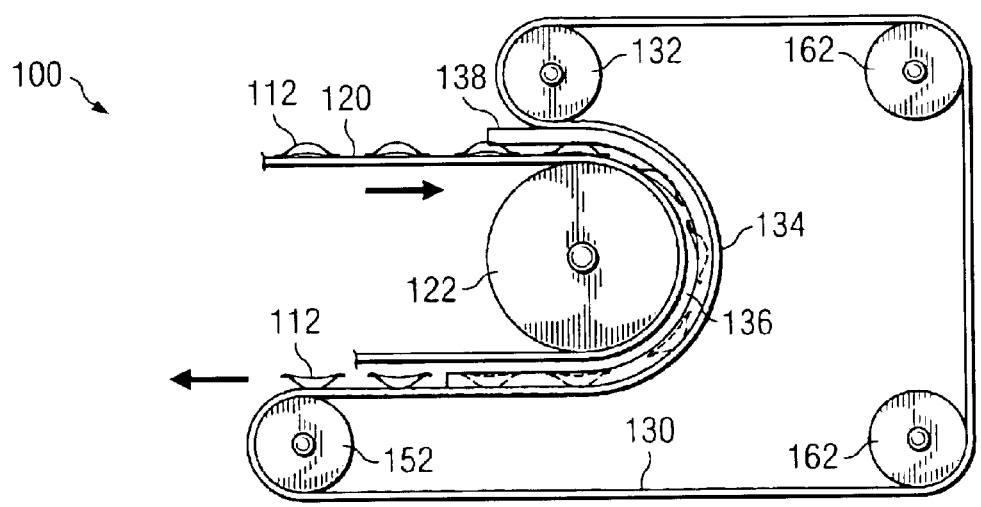
FIG. 2 is a schematic elevational view of a flipping device in accordance with one embodiment of the present invention whereby flipping is achieved by leading product pieces through a curved path, and the curved path is formed by leading a conveyor around static guides.
Figure 3:
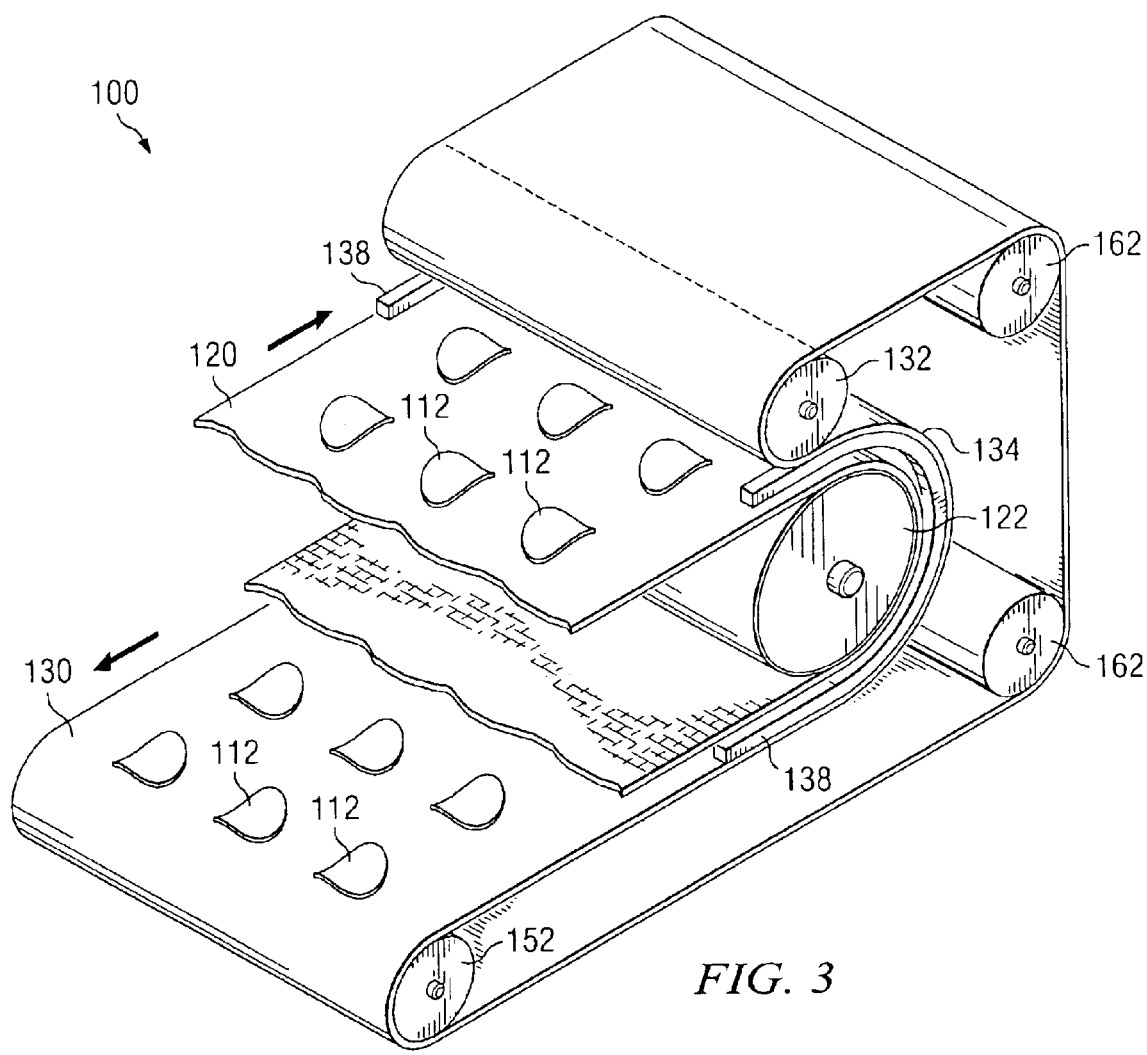
FIG. 3 is a schematic perspective view of the flipping device of FIG. 2.

A product piece flipping apparatus 100 in accordance with the invention is shown in FIGS. 2 and 3 for flipping food product pieces. Product pieces such as potato crisps or other farinaceous-based food products are often prepared in form fryers producing molded product pieces. As these product pieces are imparted with a particular shape, it is often desirable to turn the product pieces over for more efficient stacking, packaging and/or seasoning.

For example, a form fryer employing convex molds with convex sides facing the entering preforms will form product pieces 112 that are concave wherein the longitudinal edges of each cooked product piece are curved upward. While a generally elliptical shape is shown for the product pieces, other shapes are possible such as squares, circles, or triangles depending on the shape of the preforms. These shaped product pieces 112 are formed so that they may be stacked together in a seated arrangement for packaging in a canister-type container. However, shingled or spaced rows of such product pieces may be more amenable to stacking in one particular orientation. For instance, elliptically shaped potato crisps having their longer sides curved upwards, when arranged in rows, are more easily pushed together and stacked when resting concave-side-down on their curved, longer sides than when resting concave-side-up on their backs. Therefore the fully cooked product pieces 112 are turned over with a flipping apparatus 100 so that the product pieces 112 may be more easily stacked. Once stacked, a canister may be slid over this stack for packaging.

Figure 1:
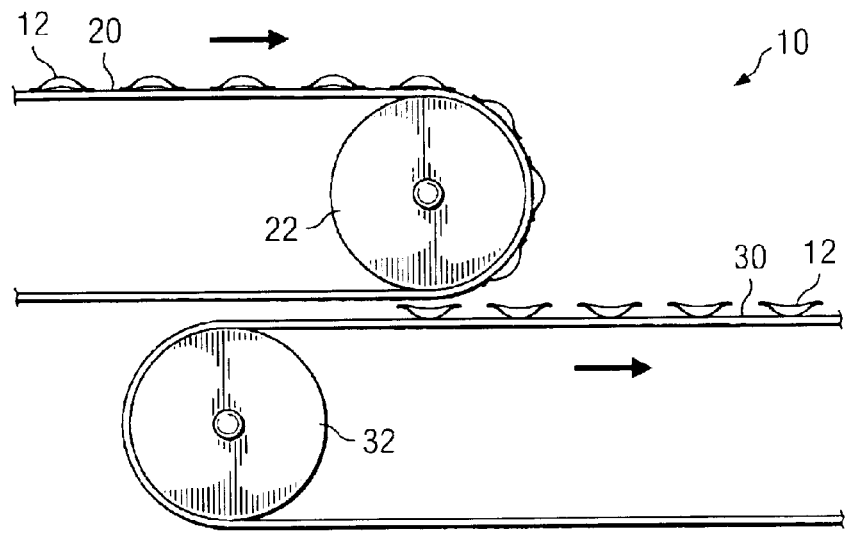
FIG. 1 is a schematic elevational view of a prior-art flipping device.

In one embodiment, fully cooked product pieces 112 are conveyed from a form fryer exit and are directed downstream to be seasoned, flipped and then packaged. The product pieces 112 are conveyed on the endless belt of a first conveyor 120 after cooking and/or seasoning to a flipping apparatus 100. The first conveyor 120 has a convex terminal end where the first conveyor's endless belt translates about an end roller 122. As the product pieces 112 approach the end roller 122 at the terminal end of the first conveyor 120, they pass under an upwardly curving portion 134 of a second conveyor 130 before being transferred to the second conveyor 130 and turned over in the curved portion 134. Unlike the upper conveyor 20 of the prior art flipping apparatus shown in FIG. 1, the conveyor material of the present invention is not limited to wire mesh or other gas-permeable materials. For example, the endless belts of the first and second conveyors 120, 130 can comprise segments of metal or alloy, chain links, wire mesh, or they may comprise of a continuous sheet or belt of fabric, metal or polymer material. The conveyor material must be sufficient to withstand processing conditions such as the cooking temperatures and moisture levels that would be experienced in treating product pieces such as potato crisps.

At about the end roller 122, which supports at least in part the first conveyor 120, the second conveyor 130 follows a curved path 134 up and around the first conveyor 120, thereby defining a concavity in which the convex terminal end of the first conveyor 120 is nested. The C-shaped curved path 134 comprises an upwardly curving portion of the second conveyor 130 and generally follows a path encircling but not touching the first conveyor's convex terminal end. Between the curved surface portion 134 of the second conveyor 130 and the first conveyor 120, a curved channel 136 is provided through which the product pieces 112 can pass. The channel 136 is set large enough so that the product pieces 112 being conveyed will not be crushed or otherwise damaged when disposed between the first and second conveyors 120, 130. However, in the preferred embodiment, the channel 136 is sufficiently small in the area where the product pieces 112 first lose contact with the first conveyor 120 so that there is little to no loss of contact with the product pieces 112 as they are transferred from the first conveyor 120 to the second conveyor 130. Beginning from a downstream bottom roller 152, which is positioned beneath the first conveyor 120, the endless second conveyor 130 follows a return path defined by at least one return-path roller 162. The second conveyor 130 travels beyond, up and around the first conveyor 120 as it is led about the return-path roller(s) 162. Once the second conveyor 130 is elevated above the first conveyor 120, the second conveyor 130 then travels over the first conveyor 120 to the curvature-segment top roller 132 where the second conveyor 130 begins its product piece collection path. Then the second conveyor 130 travels around the top roller 132 and follows two static guides 138 down the interior of the curved path 134, forming the inner curved surface portion of the second conveyor 130. As the product pieces 112 separate from and glide off of the end of the first conveyor 120, they are collected from above by the second conveyor's inner curved (or curving) surface portion 134, which is axial to the first conveyor's terminal end.

Centrifugal force allows the product pieces to transfer gently from the first conveyor 120 to the second conveyor 130 and to remain in contact with the second conveyor 130 throughout the second conveyor's curved path 134. The inner curved surface portion 134 of the second conveyor 130 first makes contact with the upper portions of the product pieces 112 as (or shortly after) the lower portions of the product pieces 112 separate from the end of the first conveyor 130, after which the curving surface portion 134 guides the product pieces downward and rotates them. The second conveyor 130 is operated at a velocity sufficient to create the centrifugal force necessary to ensure successful transfer of the product pieces 112 from the first conveyor 120 to the second conveyor 130. With sufficient centrifugal force, the product pieces 112 will remain in contact with the surface of the second conveyor 130 as they travel through the curved path 134. However, if there is too much centrifugal force the product may be damaged. Thus, the amount of centrifugal force used must not be greater than the force required to break the product. Thus, the force must be sufficient to ensure contact with the surface of the second conveyor yet not exceed the breakage force. As used herein, breakage force is the force required to break the product pieces 112. The apparatus may require adjustment as the inherent strength of the products vary. For example, product strength will depend upon whether the product is fried or baked, the geometry of the product, its ingredients, and its relative thickness. The apparatus's centrifugal force may be increased by either decreasing the radius of the end roller 122 and the curved surface portion 134 of the second conveyor. Likewise, the centrifugal force can be increased by increasing the velocity of the first and second conveyors 120, 130. Conversely, the centrifugal force of the apparatus may be decreased by increasing the radius of the end roller 122 or by decreasing the velocity of the first and second conveyor 120, 130. Thus, the velocity of the first and second conveyors 120, 130 and/or the diameter of the end roller 122 and associated channel 136 may require calibration when first brought on-line and subsequently if the product configuration changes. Further, the velocity of the first conveyor 120 is approximately matched to that of the second conveyor 130 so that the transferring product pieces 112 will not experience an abrupt change in velocity. Thereby, gentle transfer and rotation of the product pieces 112 is promoted without causing the product pieces 112 to deviate in position relative to one another. Once the product pieces 112 have traveled through the curvature segment 134, the product pieces are conveyed along the remainder of the second conveyor 130 towards the packaging stages.

In the preferred embodiment, the curved path 134 of the second conveyor 130 has a semicircular cross-section. However, other curved shapes are possible. For example, the curved path 134 can alternatively comprise a curve with a gradually increasing radius wherein the lower portion of the curved path 134 has a larger radius than the upper portion of the curved path 134. Such an increasing-radius curved path 134 helps minimize the increase in centrifugal force exerted upon the product pieces due to gravitational acceleration as they reach the lower portion of the curved path 134. It also causes the channel 136 between the second conveyor's inner curved surface portion 134 and the terminal end of the first conveyor 120 to increase in the direction of motion, which in turn allows for more space between the first and second conveyors 120, 130.

While the flipping apparatus 100 as depicted in FIGS. 2 and 3 is shown with product pieces 112 being fed from a first conveyor 120 (the feeding conveyor in the depicted embodiment) and transferred down onto a second conveyor 130 (the receiving conveyor in the depicted embodiment) disposed below the first conveyor 120, the method can be reversed. For example, product pieces 112 can be fed from the second conveyor 130 (the feeding conveyor in the reverse case) and transferred up onto the first conveyor 120 (the receiving conveyor in the reverse case) disposed above the second conveyor 130. The reverse method need only provide sufficient velocity and hence centrifugal force to retain the product pieces 112 in position along the second conveyor 130 while traveling through a curved path 134. If, while using the reverse method, it is desirable to have a more even distribution of centrifugal force throughout the curved path 134, the curved path can have a decreasing radius in the direction of motion rather than a constant radius. However, the shape of the curved path 134 is not limited to semicircular and decreasing-radius cross-sections and is constrained only by the requirement that the curved path 134 provide enough centrifugal force to retain control over the product pieces 112 without damaging them.

The general shape of the curved path 134 is easily controlled with the use of adjustable guides, such as the two static guides 138 depicted in FIGS. 2 and 3. Thereby, the curved path 134 can be adjusted depending on the particular dimensions of the product pieces being flipped. This allows different product lines to be processed and turned over with the flipping apparatus 100. The guides may alternatively comprise rollers, curved plates, rails, or any other apparatus for leading a conveyor belt through a circuitous path.

Figure 4:
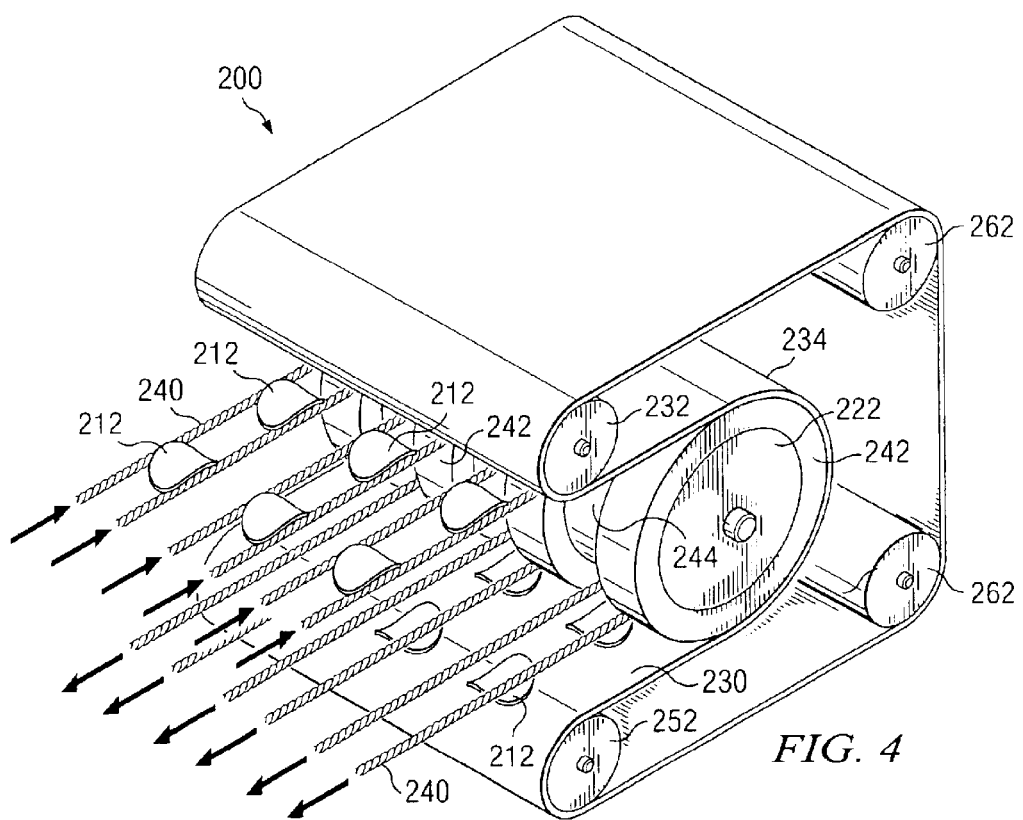
FIG. 4 is a schematic perspective view of an alternative embodiment in which a curved path is formed by leading a conveyor around a grooved roller.
Figure 5:
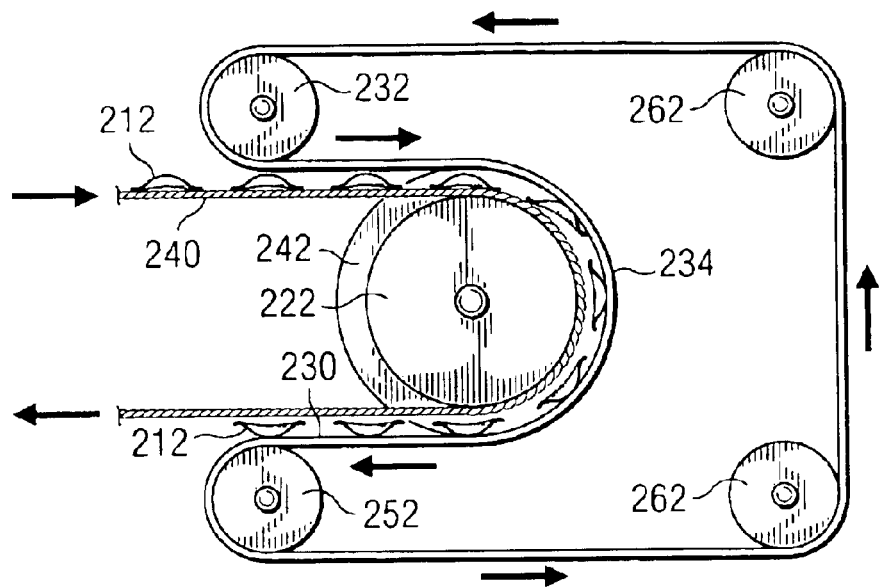
FIG. 5 is a schematic elevational view of the flipping device of FIG. 4.

In a preferred embodiment 200 as depicted in FIGS. 4 and 5, the end roller 222, which resembles a grooved roller or pulley, has a plurality of sections having alternating diameters—larger diameter sections 242 and smaller diameter sections 244. At a minimum, the end roller 222 has at least two larger diameter sections 242 interspersed along its length by at least one smaller diameter section 244. A plurality of slots or channels is defined between the smaller diameter sections 244 and the larger diameter sections 242. Each channel should be wide enough to fit at least one lane of product 212 and tall enough to allow product 212 to pass through without being crushed or jammed. In such an embodiment the end roll 222 essentially comprises a plurality of evenly spaced discs (the larger diameter sections 242) that are interconnected along a shared axis by a plurality of smaller diameter sections 244. A first conveyor 240, which comprises a plurality of individual endless conveyors operating in parallel, rotates about the smaller diameter sections 244 from about a twelve o'clock position to about a six o'clock position such that each disc protrudes between adjacent belts or pairs of ropes. This first conveyor 240 comprises a plurality of belts or ropes (or cords). The second conveyer 230 mates with and translates about the larger diameter sections 242 of the end roller 222 from about a twelve o'clock position to about a six o'clock position after the second conveyor 230 moves downstream from a curvature-segment top roller 232. In one embodiment, a rope conveyor 240 is used as the first conveyor. The ropes from the rope conveyor 240 translate about the smaller diameter section 244 of the end roller 222. In a preferred embodiment, each segment of the smaller diameter portion 244 comprises two grooves on either side in order to help hold a pair of ropes in place. In another embodiment, the first conveyor 240 comprises a plurality of belts rather than ropes, wherein each segment of the smaller diameter portion supports a single strip of belting. The web can comprise materials including, but not limited to, a fabric material, a metallic material, a polymer material, a chain-link material, or a wire-mesh material. Although FIGS. 4 and 5 depict a particular circuitous path for the second conveyor 230 in which the second conveyor 230 makes right-angle turns around two return-path rollers 262, the exact return path of the second conveyor 230 to and from its mating with the end roller 222 is not critical, and other variations are possible.

In operation, the first conveyor 240 carries lanes of product 212 into the channels defined between the larger and smaller diameter sections 242, 244 of the end roller 222 as the first conveyor 240 reaches and rotates about the smaller diameter sections 244 of the end roller 222. The product 212 then transfers from the first conveyor 240 to the second conveyor 230. Centrifugal force keeps the product 212 seated against the second conveyor 230 as it translates in a curved path 234 about the larger diameter section 242 of the end roller 222. The product 212 is turned over as it moves along the curved path 234. The turned-over product 212 then exits the bottom of the channels and continues along the second conveyor 230 towards a downstream end where the second conveyor 230 translates about a downstream bottom roller 252, which is positioned beneath the first conveyor 220. The second conveyor 230 then begins its return path after rounding the downstream bottom roller 252.

Figure 6:
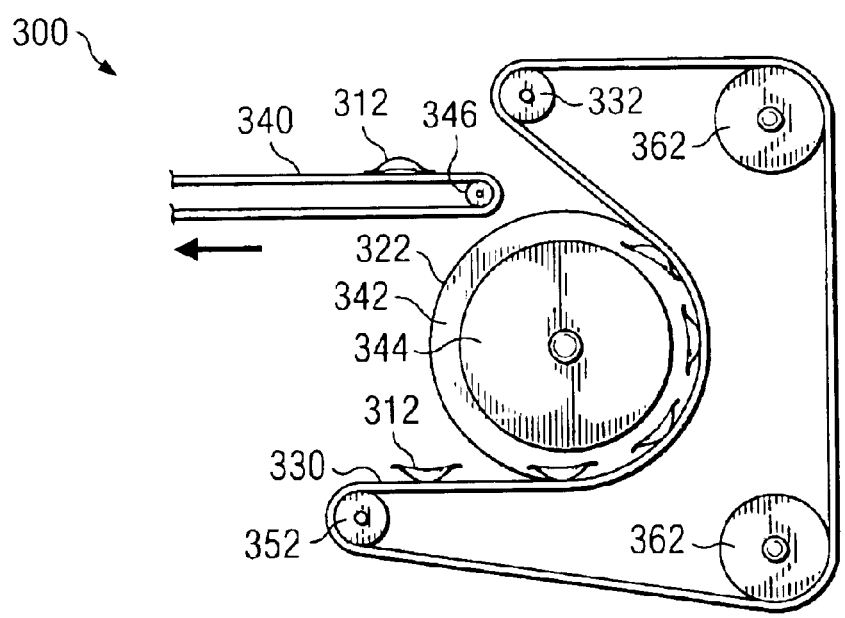
FIG. 6 is a schematic elevational view of another alternative embodiment in which a curved path is formed by leading a conveyor around a grooved roller.

FIG. 6 depicts another embodiment 300 in which a second conveyor 330 translates about a grooved end roller 322 having different diameter sections. Like the end roller 222 in FIGS. 4 and 5, the end roller 322 shown in FIG. 6 has at least two diameters—larger diameter sections 342 and smaller diameter sections 344. A plurality of slots or channels is defined between the smaller diameter sections 344 and the larger diameter sections 342. The larger diameter sections 342 substantially mate with the second conveyer 330 from about a twelve o'clock position to about a six o'clock position as both the end roller 322 and the top roller 332 rotate. Unlike the embodiment shown in FIGS. 4 and 5, however, a first conveyor 340 does not rotate about the end roller 322. Rather than share the same rotating shaft, the first conveyor 340 instead translates about its own terminal support member 346, which, for example, can comprise a roller or nose bar. Again, the first conveyor 340 can comprise a plurality of belts or ropes (or cords). By rotating the second conveyor 330 about a grooved roller 322 to form a curved portion for flipping, one can avoid the use of static spacers 138 as depicted in FIGS. 2 and 3, as well as benefit from the simplicity and longer durability of rollers. Furthermore, having the first conveyor 340 bypass the grooved roller 322 allows one to use a single piece of belting for the first conveyor 340 rather than a plurality of belts or ropes 240 as depicted in FIGS. 4 and 5.

By using the flipping apparatus as described herein, product pieces can be turned over while preserving the position of the pieces relative to each other. This is beneficial considering that many shaped product pieces such as potato and corn crisps are more amenable to seasoning, stacking and packaging in one particular orientation over another. Thus, the reliable and consistent apparatus and method for flipping product disclosed herein is advantageous for achieving optimized seasoning, stacking and packaging. As the present invention dispenses with the need for vacuum rolls, conveyor permeability limitations and the associated clogging problems are avoided. The higher costs associated with operating vacuum rolls are also avoided. The present invention therefore provides a more efficient and reliable apparatus and method for flipping product with minimal product damage.

While the invention has been particularly shown and described with reference to a preferred embodiment, it will be understood by those skilled in the art that various changes in form and detail may be made therein without departing from the spirit and scope of the invention.

What is claimed is:

1. An apparatus for flipping a product, said apparatus comprising:
   an end roller;
   a first conveyor, wherein said first conveyor translates about said end roller, thereby forming a convex terminal end; and
   a second conveyor having a curved path, wherein said curved path has an essentially horizontal axis of rotation, and further wherein said curved path defines a concavity;
   wherein:
      said convex terminal end of said first conveyor is positioned in a nested arrangement with said concavity, thereby defining a channel for product to pass therethrough and turn over;
      said end roller comprises a grooved roller having at least two larger diameter sections interspersed along the length of the grooved roller by at least one smaller diameter section;
      said first conveyor is supported by and rotates about said at least one smaller diameter section; and
      said second conveyor is supported by and rotates about said at least two larger diameter sections, thereby forming said curved path.

2. The flipping apparatus of claim 1 wherein said first conveyor comprises a plurality of endless belts.

3. The flipping apparatus of claim 1 wherein said first conveyor comprises a plurality of endless cords.

4. An apparatus for flipping a product, said apparatus comprising:
   a first conveyor having a terminal end;
   a second conveyor having a curving surface portion on one side axial to said terminal end of said first conveyor, wherein said first conveyor and said second conveyor are positioned so that the terminal end of said first conveyor and the curving surface portion of said second conveyor define at least one channel for product to pass therethrough and turn over; and
   a grooved roller having at least two larger diameter sections interspersed along the length of the grooved roller by at least one smaller diameter section, wherein said first conveyor is supported by and rotates about said at least one smaller diameter section, and further wherein said second conveyor is supported by and rotates about said at least two larger diameter sections, thereby defining said at least one channel.

5. The flipping apparatus of claim 4 wherein said first conveyor further comprises a plurality of endless belts.

6. The flipping apparatus of claim 4 wherein said first conveyor further comprises a plurality of cords.

* * * * *